(12) United States Patent
Bao et al.

(10) Patent No.: US 12,436,330 B2
(45) Date of Patent: Oct. 7, 2025

(54) LIGHT COLOR COATINGS FOR ELECTRONIC DEVICES

(71) Applicant: Apple Inc., Cupertino, CA (US)

(72) Inventors: Lijie Bao, Saratoga, CA (US); Jiayun Liu, Suzhou (CN); Fei Tong, Shanghai (CN); Jozef M. Matlak, Berkeley, CA (US); Sonja R. Postak, Palo Alto, CA (US); Brian S. Tryon, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 844 days.

(21) Appl. No.: 17/459,843

(22) Filed: Aug. 27, 2021

(65) Prior Publication Data

US 2022/0350062 A1  Nov. 3, 2022

Related U.S. Application Data

(60) Provisional application No. 63/183,558, filed on May 3, 2021.

(51) Int. Cl.
*G04G 17/02* (2006.01)
*G02B 5/28* (2006.01)
(Continued)

(52) U.S. Cl.
CPC ....... *G02B 5/286* (2013.01); *G02F 1/133308* (2013.01); *G04G 17/00* (2013.01);
(Continued)

(58) Field of Classification Search
CPC .......... G02B 5/286; G02B 1/10; G02B 5/285; G02B 1/12; G02F 1/133308;
(Continued)

(56) References Cited

U.S. PATENT DOCUMENTS

| 2013/0084465 A1 | 4/2013 | Anton et al. |
| 2020/0071838 A1 | 3/2020 | Tryon et al. |
| 2021/0048565 A1* | 2/2021 | Tryon ..................... C23C 28/32 |

FOREIGN PATENT DOCUMENTS

| CN | 1233042 A | 10/1999 |
| CN | 101367286 A | 2/2009 |

(Continued)

OTHER PUBLICATIONS

WO-2009123167-A1—Translation; Iwashita, Hiroyuki, Shishido, Hiroaki, Kominato, Atsushi, Hashimoto, Masahiro (Year: 2009).*
U.S. Appl. No. 17/176,992, filed Feb. 16, 2021.

*Primary Examiner* — Aaron Austin
(74) *Attorney, Agent, or Firm* — Treyz Law Group, P.C.; Michael H. Lyons; David K. Cole

(57) ABSTRACT

An electronic device may include conductive structures with a light-reflecting coating. The coating may have a two or four-layer thin-film interference filter. The two-layer filter may have a CrN layer and an SiCrN layer. The four-layer filter may have two CrN layers and two SiCrN layers. The two-layer filter may be used to coat relatively small conductive components. The four-layer filter may be used to coat a conductive housing sidewall. Both types of interference filter may produce a relatively uniform light blue color despite variations in coating thickness produced on account of the geometry of the underlying conductive structure.

15 Claims, 8 Drawing Sheets

(51) Int. Cl.
  *G02F 1/1333*  (2006.01)
  *G04G 17/00*  (2013.01)
  *H04M 1/02*  (2006.01)
  *H04M 1/23*  (2006.01)
  *G06F 1/16*  (2006.01)

(52) U.S. Cl.
  CPC ......... *H04M 1/0283* (2013.01); *H04M 1/236* (2013.01); *G02F 1/133331* (2021.01); *G02F 2202/28* (2013.01); *G04G 17/02* (2013.01); *G06F 1/163* (2013.01); *G06F 1/1637* (2013.01)

(58) Field of Classification Search
  CPC .......... G02F 1/133331; G02F 2202/28; G04G 17/00; G04G 17/02; H04M 1/0283; H04M 1/236; G06F 1/163; G06F 1/1637; C09D 5/004; C09D 1/00; C23C 28/04; C23C 14/0015; C23C 14/0641; C01B 21/0602; H05K 5/0217; H05K 5/0017
  See application file for complete search history.

(56) References Cited

FOREIGN PATENT DOCUMENTS

| | | | | |
|---|---|---|---|---|
| CN | 103789723 A | 5/2014 | | |
| CN | 105568230 A | 5/2016 | | |
| WO | WO-2009123167 A1 * | 10/2009 | ............... | G03F 1/32 |

* cited by examiner

US 12,436,330 B2

LIGHT COLOR COATINGS FOR ELECTRONIC DEVICES

This application claims the benefit of U.S. Provisional Patent Application No. 63/183,558, filed May 3, 2021, which is hereby incorporated by reference herein in its entirety.

FIELD

This disclosure relates generally to coatings for electronic device structures and, more particularly, to visible-light-reflecting coatings for conductive electronic device structures.

BACKGROUND

Electronic devices such as cellular telephones, computers, watches, and other devices contain conductive structures such as conductive housing structures. The conductive structures are provided with a coating that reflects particular wavelengths of light so that the conductive components exhibit a desired visible color.

It can be challenging to provide coatings such as these with a desired color brightness. In addition, if care is not taken, the coatings may exhibit unsatisfactory optical performance across different operating environments and conductive structure geometries.

SUMMARY

An electronic device may include conductive structures such as conductive housing structures. A visible-light-reflecting coating may be formed on the conductive structures. The coating may have adhesion and transition layers and a multi-layer thin-film interference filter on the adhesion and transition layers. The multi-layer thin-film interference filter be a two-layer thin-film interference filter or a four-layer thin-film interference filter. The two-layer thin-film interference filter may have a CrN layer and an SiCrN layer. The four-layer thin-film interference filter may have two CrN layers and two SiCrN layers. The two-layer thin-film interference filter may be used to coat relatively small conductive components. The four-layer thin-film interference filter may be used to coat a conductive housing sidewall. Both types of interference filter may produce a relatively uniform light blue color despite variations in coating thickness produced on account of the geometry of the underlying conductive structure.

An aspect of the disclosure provides an apparatus. The apparatus can have a conductive substrate. The apparatus can have a coating on the substrate. The coating can have a color. The coating can have adhesion and transition layers. The coating can have a thin-film interference filter on the adhesion and transition layers. The thin-film interference filter can include an SiCrN layer and a CrN layer. The CrN layer can be an uppermost layer of the thin-film interference filter. The SiCrN layer can be a lowermost layer of the thin-film interference filter.

Another aspect of the disclosure provides an apparatus. The apparatus can have a conductive substrate. The apparatus can have a coating on the conductive substrate. The coating can have a color. The coating can have adhesion and transition layers. The coating can have a four-layer thin-film interference filter on the adhesion and transition layers. The four-layer thin-film interference filter can have a first SiCrN layer, a first CrN layer that contacts the first SiCrN layer, a second SiCrN layer that contacts the first CrN layer, and a second CrN layer that contacts the second SiCrN layer. The first SiCrN layer can be a lowermost layer of the four-layer thin-film interference filter.

Yet another aspect of the disclosure provides an electronic device. The electronic device can have a conductive sidewall. The electronic device can have a display with a display cover layer mounted to the conductive sidewall. The electronic device can have a conductive structure. The electronic device can have a first coating on the conductive structure. The first coating can include first adhesion and transition layers. The first coating can include a two-layer thin-film interference filter on the first adhesion and transition layers. The two-layer thin-film interference filter can include a lowermost SiCrN layer and an uppermost CrN layer. The electronic device can include a second coating on the conductive sidewall. The second coating can include second adhesion and transition layers. The second coating can include a four-layer thin-film interference filter on the second adhesion and transition layers. The four-layer thin-film interference filter can include a first SiCrN layer on the second adhesion and transition layers, a first CrN layer on the first SiCrN layer, a second SiCrN layer on the first CrN layer, and a second CrN layer on the second SiCrN layer.

DETAILED DESCRIPTION

Electronic devices and other items may be provided with conductive structures. Coatings may be deposited on the conductive structures to reflect particular wavelengths of visible light so that the conductive structures exhibit a desired color. A visible-light-reflecting coating may be deposited on a conductive substrate. The coating may include transition and adhesion layers on the substrate and a multi-layer thin-film interference filter on the transition and adhesion layers. The thin-film interference filter may be a four-layer thin-film interference filter having two CrN layers and two SiCrN layers. If desired, the thin-film interference filter may be a two-layer thin-film interference filter having a lowermost SiCrN layer and an uppermost CrN layer. Coatings having the two-layer thin-film interference filter may be used to coat relatively small conductive components. Coatings having the four-layer thin-film interference filter may be used to coat a conductive housing sidewall. Both coatings with the two-layer thin-film interference filter and the four-layer thin-film interference filter exhibit a relatively uniform light blue color despite thickness variations produced on account of the geometry of the underlying conductive structures.

Figure 1:
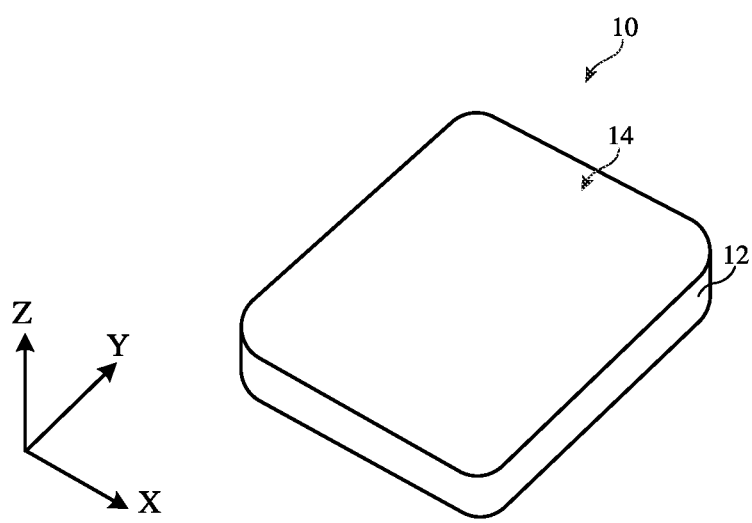
FIG. 1 is a perspective view of an illustrative electronic device of the type that may be provided with conductive structures and visible-light-reflecting coatings in accordance with some embodiments.

An illustrative electronic device of the type that may be provided with conductive structures and visible-light-reflecting coatings is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head (e.g., a head mounted device), or other wearable or miniature device, a television, a computer display that does not contain an embedded computer, a gaming device, a navigation device, an embedded system such as a system in which electronic equipment with a display is mounted in a kiosk or automobile, a wireless base station, a home entertainment system, a wireless speaker device, a wireless access point, equipment that implements the functionality of two or more of these devices, or other electronic equipment. In the illustrative configuration of FIG. 1, device 10 is a portable device having a substantially rectangular lateral outline such as a cellular telephone or tablet computer. Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls or sidewalls formed from other materials. Examples of metal materials that may be used for forming housing 12 include stainless steel, aluminum, silver, gold, titanium, metal alloys, or any other desired conductive material.

Display 14 may be formed at (e.g., mounted on) the front side (face) of device 10. Housing 12 may have a rear housing wall on the rear side (face) of device 10 that opposes the front face of device 10. Conductive housing sidewalls in housing 12 may surround the periphery of device 10. The rear housing wall of housing 12 may be formed from conductive materials and/or dielectric materials.

The rear housing wall of housing 12 and/or display 14 may extend across some or all of the length (e.g., parallel to the X-axis of FIG. 1) and width (e.g., parallel to the Y-axis) of device 10. Conductive sidewalls of housing 12 may extend across some or all of the height of device 10 (e.g., parallel to Z-axis).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include one or more buttons. The buttons may be formed from a conductive button member that is located within (e.g., protruding through) openings in housing 12 or openings in display 14 (as examples). Buttons may be rotary buttons, sliding buttons, buttons that are actuated by pressing on a movable button member, etc.

Figure 2:
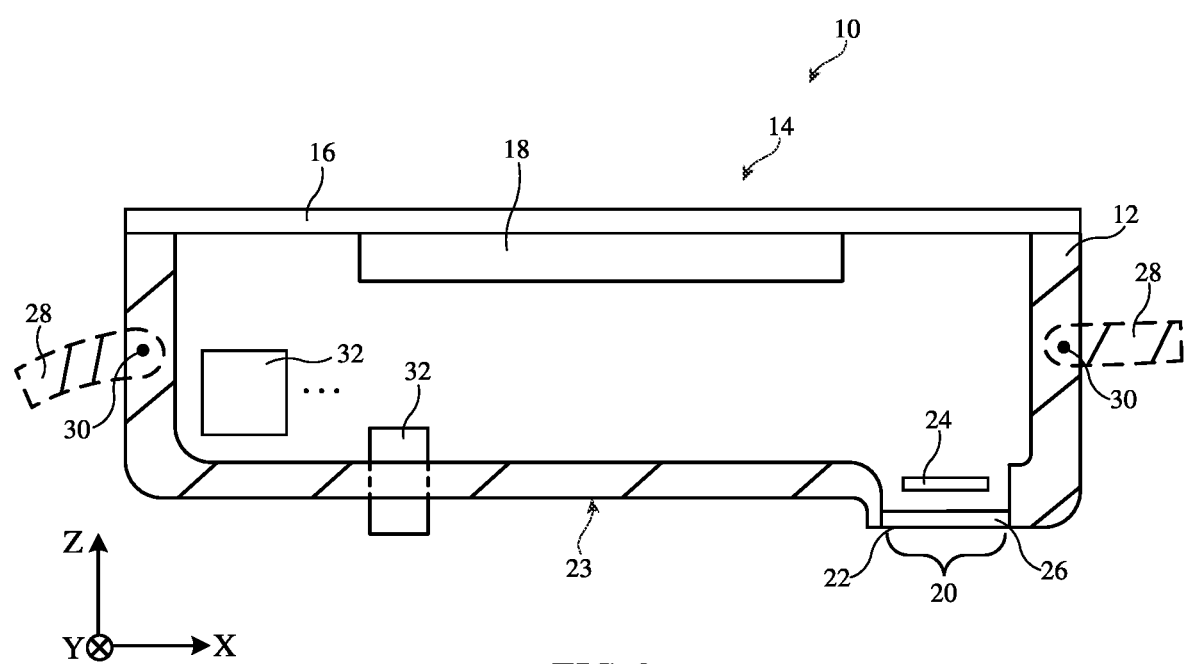
FIG. 2 is cross-sectional side view of an illustrative electronic device having conductive structures that may be provided with visible-light-reflecting coatings in accordance with some embodiments.

A cross-sectional side view of device 10 in an illustrative configuration in which display 14 has a display cover layer is shown in FIG. 2. As shown in FIG. 2, display 14 may have one or more display layers that form pixel array 18. During operation, pixel array 18 forms images for a user in an active area of display 14. Display 14 may also have inactive areas (e.g., areas along the border of pixel array 18) that are free of pixels and that do not produce images. Display cover layer 16 of FIG. 2 overlaps pixel array 18 in the active area and overlaps electrical components in device 10.

Display cover layer 16 may be formed from a transparent material such as glass, plastic, ceramic, or crystalline materials such as sapphire. Illustrative configurations in which a display cover layer and other transparent members in device 10 (e.g., windows for cameras and other light-based devices that are formed in openings in housing 12) are formed from a hard transparent crystalline material such as sapphire (sometimes referred to as corundum or crystalline aluminum oxide) may sometimes be described herein as an example. Sapphire makes a satisfactory material for display cover layers and windows due to its hardness (9 Mohs). In general, however, these transparent members may be formed from any suitable material.

Display cover layer 16 for display 14 may be planar or curved and may have a rectangular outline, a circular outline, or outlines of other shapes. If desired, openings may be formed in the display cover layer. For example, an opening may be formed in the display cover layer to accommodate a button, a speaker port, or other component. Openings may be formed in housing 12 to form communications or data ports (e.g., an audio jack port, a digital data port, a port for a subscriber identity module (SIM) card, etc.), to form openings for buttons, or to form audio ports (e.g., openings for speakers and/or microphones).

Device 10 may, if desired, be coupled to a strap such as strap 28 (e.g., in scenarios where device 10 is a wristwatch device). Strap 28 may be used to hold device 10 against a user's wrist (as an example). Strap 28 may sometimes be referred to herein as wrist strap 28. In the example of FIG. 2, wrist strap 28 is connected to attachment structures 30 in housing 12 at opposing sides of device 10. Attachment structures 30 may include lugs, pins, springs, clips, brackets, and/or other attachment mechanisms that configure housing 12 to receive wrist strap 28. Configurations that do not include straps may also be used for device 10.

Figure 3:
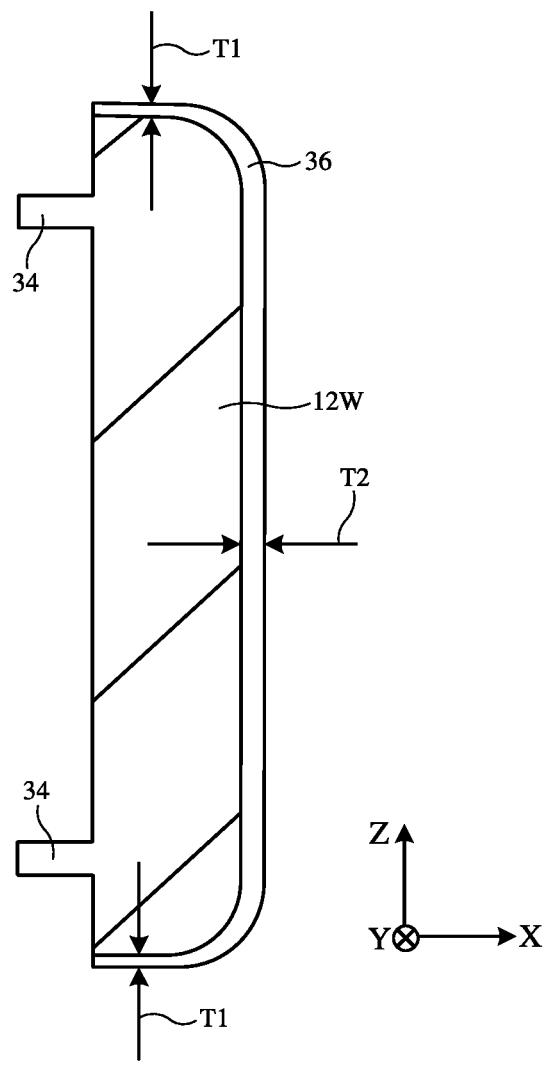
FIG. 3 is an exploded cross-sectional side view of an illustrative conductive housing sidewall that may be provided with a visible-light-reflecting coating in accordance with some embodiments.

If desired, light-based components such as light-based components 24 may be mounted in alignment with an opening 20 in housing 12. Opening 20 may be circular, may be rectangular, may have an oval shape, may have a triangular shape, may have other shapes with straight and/or curved edges, or may have other suitable shapes (outlines when viewed from above). Window member 26 may be mounted in window opening 20 of housing 12 so that window member 26 overlaps component 24. A gasket, bezel, adhesive, screws, or other fastening mechanisms may be used in attaching window member 26 to housing 12. Surface 22 of window member 26 may lie flush with exterior surface 23 of housing 12, may be recessed below exterior surface 23, or may, as shown in FIG. 3, be proud of exterior surface 23 (e.g., surface 22 may lie in a plane that protrudes away from surface 23 in the −Z direction). In other words, window member 26 may be mounted to a protruding portion of housing 12. Surface 23 may, for example, form the rear face of housing 12.

Conductive structures in device 10 may be provided with a visible-light-reflecting coating that reflects certain wavelengths of light so that the conductive structures exhibit a desired aesthetic appearance (e.g., a desired color, reflectivity, etc.). The conductive structures in device 10 may include, for example, conductive portions of housing 12 (e.g., conductive sidewalls for device 10, a conductive rear wall for device 10, a protruding portion of housing 12 used to mount window member 26, etc.), attachment structures 30, conductive portions of wrist strap 28, a conductive mesh, conductive components 32, and/or any other desired conductive structures on device 10. Conductive components 32 may include internal components (e.g., internal housing members, a conductive frame, a conductive chassis, a conductive support plate, conductive brackets, conductive clips, conductive springs, input-output components or devices, etc.), components that lie both at the interior and exterior of device 10 (e.g., a conductive SIM card tray or SIM card port, a data port, a microphone port, a speaker port, a conductive button member, etc.), or components that are mounted at the exterior of device 10 (e.g., conductive portions of strap 28 such as a clasp for strap 28, a protruding portion of housing 12 at window member 26), conductive screws, and/or any other desired conductive structures on device 10. Conductive button members in device 10 may extend through openings in conductive sidewalls for device 10 if desired.

FIG. 3 is an exploded cross-sectional side view of a conductive sidewall in device 10 that may be provided with a visible-light-reflecting coating. As shown in FIG. 2, housing 12 may include peripheral conductive housing structures such as conductive sidewall 12W. Conductive sidewall 12W may, for example, run around the lateral periphery of device 10 in the X-Y plane (e.g., conductive sidewall 12W may run around the periphery of display 14 of FIG. 2 and may serve as a conductive bezel for the display).

Conductive sidewall 12W may include one or more ledges 34. Ledges 34 may be used to support a conductive and/or dielectric rear wall for device 10 (e.g., at the rear face of device 10) and/or to support display cover layer 16 of FIG. 2 (e.g., at the front face of device 10). In order to provide conductive sidewall 12W with a desired visible color, a visible-light-reflecting coating such as coating 36 may be deposited onto conductive sidewall 12W (e.g., all of conductive sidewall 12W, the portions of conductive sidewall 12W at the exterior of device 10, etc.). Coating 36 may also be deposited over other conductive structures in device 10 (e.g., conductive components 32 of FIG. 2, other conductive portions of housing 12, etc.).

In practice, the coating may have different thicknesses across its surface area due to changes in the underlying geometry of the conductive structure (e.g., because of coating deposition equipment limitations in depositing uniform coatings across the underlying geometry). For example, coating 36 of FIG. 3 may exhibit a first thickness T1 at the bottom and top edges of conductive sidewall 12W (e.g., where conductive sidewall 12W exhibits a curved three-dimensional shape) but may exhibit a second thickness T2 along the center of conductive sidewall 12W (e.g., where conductive sidewall 12W exhibits a substantially planar shape). Thickness T2 may represent the maximum thickness of coating 36 across its surface area. Thickness T1 may be less than thickness T2 (e.g., 40-50% of thickness T2). If care is not taken, variations in thickness along the surface area of coating 36 can undesirably alter the color of visible light reflected by the coating and thus the aesthetic appearance of the underlying conductive structure.

Figure 4:
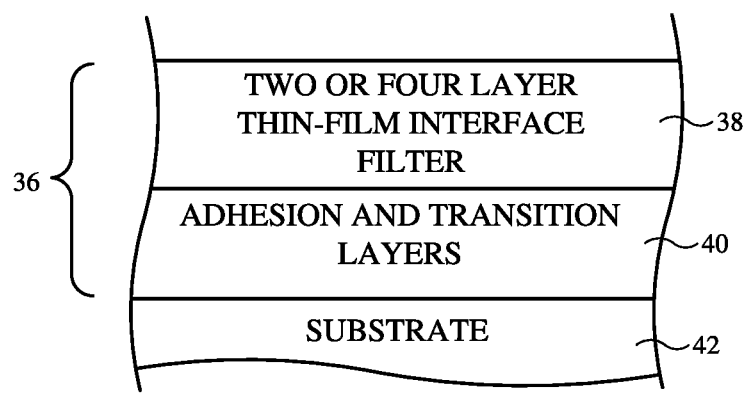
FIG. 4 is a cross-sectional side view of an illustrative visible-light-reflecting coating having a multi-layer thin-film interference filter in accordance with some embodiments.

FIG. 4 is a cross-sectional diagram of coating 36. As shown in FIG. 4, coating 36 may be formed (deposited) on an underlying conductive substrate such as substrate 42. Substrate 42 may be a conductive structure in device 10 such as a conductive portion of housing 12 (e.g., conductive sidewall 12W of FIG. 3 or other conductive portions of housing 12 of FIGS. 1 and 2) or a conductive component 32 (FIG. 2). Substrate 42 may be thicker than coating 36. The thickness of substrate 42 may be 0.1 mm to 5 mm, more than 0.3 mm, more than 0.5 mm, between 5 mm and 20 mm, less than 5 mm, less than 2 mm, less than 1.5 mm, or less than 1 mm (as examples). Substrate 42 may include stainless steel, aluminum, titanium, or other metals or alloys. In other suitable arrangements, substrate 42 may be an insulating substrate such as a ceramic substrate, a glass substrate, or substrates formed from other materials.

Coating 36 may include adhesion and transition layers 40 on substrate 42 and a multi-layer thin-film interference filter such as thin-film interference filter 38 on adhesion and transition layers 40. Thin-film interference filter 38 may, for example, have a first lateral surface that directly contacts adhesion and transition layers 40 and may have a second lateral surface opposite the first lateral surface. Thin-film interference filter 38 may include multiple layers (films) stacked on adhesion and transition layers 40. In arrangements that are described herein as an example, thin-film interference filter 38 may include two or four layers. This is merely illustrative and, if desired, thin-film interference filter 38 may include other numbers of layers (e.g., three layers, five layers, more than six layers, etc.).

The layers of coating 36 may be deposited on substrate 42 using any suitable deposition techniques. Examples of techniques that may be used for depositing the layers in coating 36 include physical vapor deposition (e.g., evaporation and/or sputtering), cathodic arc deposition, chemical vapor deposition, ion plating, laser ablation, etc. For example, coating 36 may be deposited on substrate 42 in a deposition system having deposition equipment (e.g., a cathode). Substrate 42 may be moved (e.g., rotated) within the deposition system while the deposition equipment (e.g., the cathode) deposits the layers of coating 36. If desired, substrate 42 may be moved/rotated dynamically with respect to speed and/or orientation relative to the deposition equipment (e.g., the cathode) during deposition. This may help provide coating 36 with as uniform a thickness as possible across its area, even in scenarios where substrate 42 has a three-dimensional shape.

Thin-film interference filter 38 may be formed from a stack of layers of material such as inorganic dielectric layers with different index of refraction values. The thin-film interference filter layers may have higher index of refraction values (sometimes referred to as "high" index values) and lower index of refraction values (sometimes referred to as "low" index values). The high index layers may be interleaved with the low index layers if desired. Incident light may be transmitted through each of the layers in thin-film interference filter 38 while also reflecting off of the interfaces between each of the layers, as well as at the interface between the thin-film interference filter and adhesion and transition layers 40 and at the interface between the thin-film interference filter and air. By controlling the thickness and index of refraction (e.g., composition) of each layer in thin-film interference filter 38, the light reflected at each interface may destructively and/or constructively interfere at a selected set of wavelengths such that reflected light that passes out of the thin-film interference filter 38 is perceived by an observer with a desired color and brightness, while also exhibiting a response that is relatively invariant across the lateral area of the coating even when deposited onto an underlying substrate 42 having a three-dimensional (e.g., curved) shape. The materials used to form thin-film interference filter 38 may be selected to provide the underlying substrate 42 with a desired visible color (e.g., a light blue color) in response to light incident upon coating 36, regardless of overall thickness variations in the coating due to the geometry of the underlying substrate 42.

Figure 5:
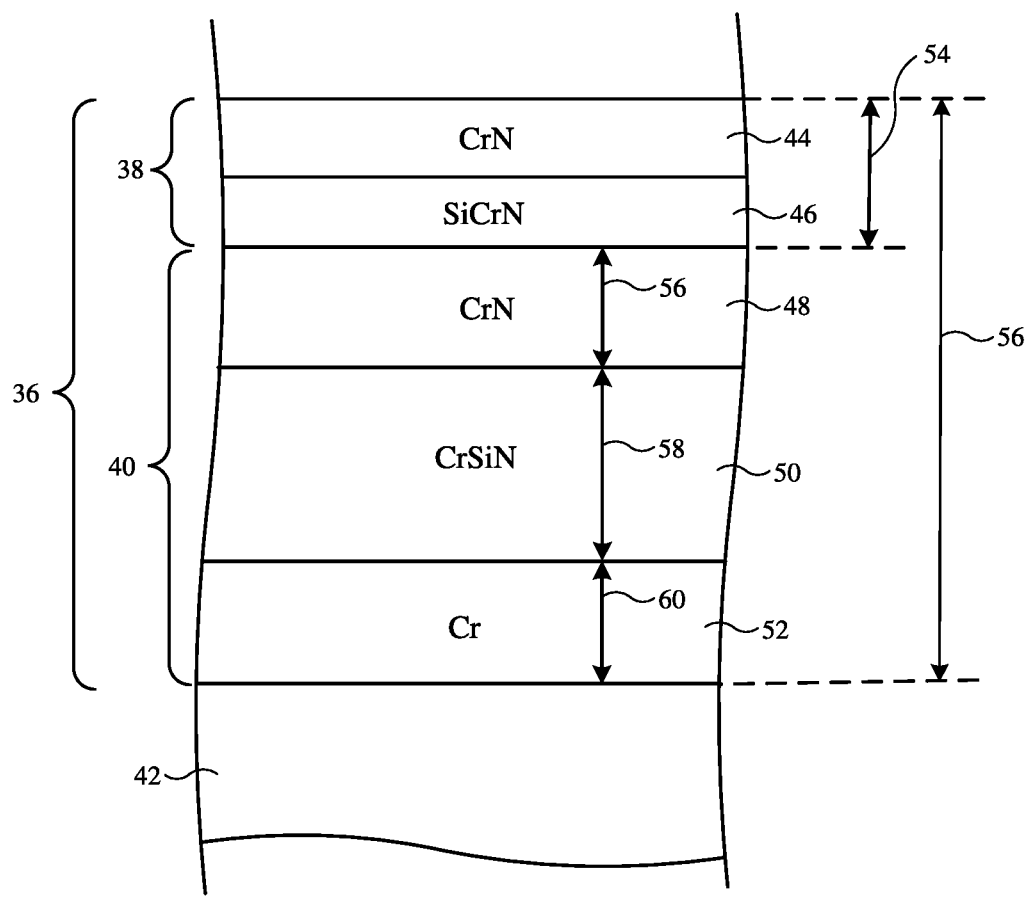
FIG. 5 is a cross-sectional side view of an illustrative visible-light-reflecting coating having a two-layer thin-film interference filter with an uppermost CrN layer and a SiCrN layer on underlying adhesion and transition layers in accordance with some embodiments.

FIG. 5 is a cross-sectional side view showing one illustrative composition for coating 36 in an example where thin-film interference filter 38 has two layers. As shown in FIG. 5, coating 36 may be layered on substrate 42. Adhesion and transition layers 40 may include a seed (adhesion) layer such as seed layer 52 on substrate 42 and one or more transition layers such as a first transition layer 50 on seed layer 52 and a second transition layer 48 on first transition layer 50. Seed layer 52 may couple substrate 42 to transition layers 50 and 48. In the example of FIG. 5, seed layer 52 is formed from chromium (Cr), transition layer 50 is formed from chromium silicon nitride (CrSiN), and transition layer 48 is formed from chromium nitride (CrN). This is merely illustrative. If desired, seed layer 52, transition layer 50, and/or transition layer 48 may include chromium, chromium silicon (CrSi), titanium (Ti), chromium silicon nitride (CrSiN), chromium silicon carbonitride (CrSiCN), chromium silicon carbide (CrSiC), chromium carbonitride (CrCN), other metals, metal alloys, and/or other materials. Coating 36 may include more than two transition layers or only a single transition layer if desired.

Seed layer 52 may have thickness 53. Thickness 53 may be, for example, 0.1-0.2 microns, 0.15 microns, 0.05-0.25 microns, less than 0.5 microns, greater than 0.1 microns, or other thicknesses. Transition layer 50 may have thickness 55. Thickness 55 may be greater than thickness 53. Thickness 55 may be, for example, 0.9-1.3 microns, 0.1 microns, 1.0-1.2 microns, 0.8-1.4 microns, greater than 1 micron, greater than 0.5 microns, less than 1.5 microns, or other thicknesses. Transition layer 48 may have thickness 56. Thickness 55 may also be greater than thickness 56. Thickness 56 may be, for example, 0.07-0.16 microns, 0.11 microns, 0.08-0.13 microns, 0.05-0.25 microns, greater than 0.05 microns, greater than 0.1 microns, less than 0.2 microns, or other thicknesses.

Thin-film interference filter 38 may include a lowermost (bottom) layer 46 having layered on transition layer 48. Thin-film interference filter 38 may also include an uppermost layer 44. Uppermost layer 44 and lowermost layer 46 may collectively exhibit thickness 54. Thickness 54 may be 0.08-0.12 microns, 0.09-0.11 microns, 0.05-0.15 microns, 0.1 microns, 0.08-0.16 microns, greater than 0.05 microns, greater than 0.09 microns, less than 0.2 microns, or other thicknesses. Coating 36 may exhibit an overall thickness 56. Overall thickness 56 may be 1.2-1.8 microns, 1.4-1.6 microns, 1.1-1.9 microns, 1.25-1.75 microns, or another thickness. These thicknesses are described herein for locations where coating 36 exhibits a maximum thickness across its surface area.

In the example of FIG. 5, lowermost layer 46 includes silicon chromium nitride (SiCrN) silicon chromium nitride (SiCrN) and may therefore sometimes be referred to herein as SiCrN layer 46. Uppermost layer 44 may include CrN and may therefore sometimes be referred to herein as CrN layer 44. Uppermost layer 44 may have the same thickness as lowermost layer 46 or layers 44 and 46 may have different thicknesses. Visible light incident on coating 36 will reflect off of the air-film interface of CrN layer 44, will pass through CrN layer 44 and reflect off of the film-film interface between CrN layer 44 and SiCrN layer 46, and will pass through SiCrN layer 46 and reflect off of transition layer 48 (e.g., without being transmitted through transition layer 48). The reflected and transmitted light from each of these interfaces constructively and destructively interfere at different wavelengths so that the total visible light reflected by coating 36 exhibits a desired color (e.g., a light blue color).

The composition of thin-film interference filter 38 may also contribute to the desired color exhibited by the coating. For example, the composition of SiCrN layer 46 may be selected such that the atomic percentage of chromium (Cr) atoms in SiCrN layer 46 is between 50-60%, 50-55%, 45-60%, 45-55%, 48-58%, 40-52%, 41-61%, 50-54%, 48-55%, greater than 40%, greater than 50%, less than 55%, less than 60%, less than 65%, or other values. The composition of SiCrN layer 46 may be selected such that the atomic percentage of silicon (Si) atoms in SiCrN layer 46 is between 15-25%, 15-23%, 12-24%, 18-22%, 17-25%, 11-23%, 10-25%, greater than 10%, greater than 15%, greater than 18%, less than 23%, less than 25%, less than 30%, or other values. The composition of SiCrN layer 46 may be selected such that the atomic percentage of nitrogen (N) atoms in SiCrN layer 46 is between 20-35%, 20-30%, 23-32%, 22-40%, 15-35%, 15-35%, greater than 15%, greater than 20%, less than 35%, less than 40%, or other values. Similarly, the composition of CrN layer 44 may be selected such that the atomic percentage of Cr atoms in CrN layer 44 is between 50-70%, 60-70%, 55-65%, 55-70%, 60-66%, 59-68%, 55-72%, 56-68%, greater than 50%, greater than 55%, greater than 60%, less than 68%, less than 70%, less than 75%, or other values. The composition of CrN layer 44 may be selected such that the atomic percentage of N atoms in CrN layer 44 is between 30-40%, 32-42%, 34-40%, 25-45%, 31-42%, greater than 25%, greater than 30%, greater than 32%, less than 40%, less than 45%, less than 50%, or other values.

When configured in this way, thin-film interference filter 38 may configure coating 36 to exhibit a desired color. For example, coating 36 may exhibit an a* value between −5 and 0, between −5 and 2, between −2 and −1, between −3 and 0, between −1 and −1.4, between −3 and 1, less than 0, less than 1, greater than −1, greater than −2, or another a* value in the L*a*b* color space. At the same time, coating 36 may exhibit a b* value between −20 and −15, between −18 and −13, between −15 and −16, between −14 and −17, between −10 and −20, less than −10, less than −12, less than −15, greater than −16, greater than −20, or another b* value in the L*a*b* color space. In addition, coating 36 may exhibit an L* value between 70 and 80, between 70 and 75, between 72 and 73, between 71 and 74, between 65 and 75, between 60 and 80, between 50 and 70, greater than 70, greater than 65, less than 75, less than 80, or another L* value in the L*a*b* color space. In other words, thin-film interference filter 38 may configure coating 36 to exhibit a light blue color. These L*a*b* values are described herein for locations where coating 36 exhibits a maximum thickness across its surface area.

Figure 6:
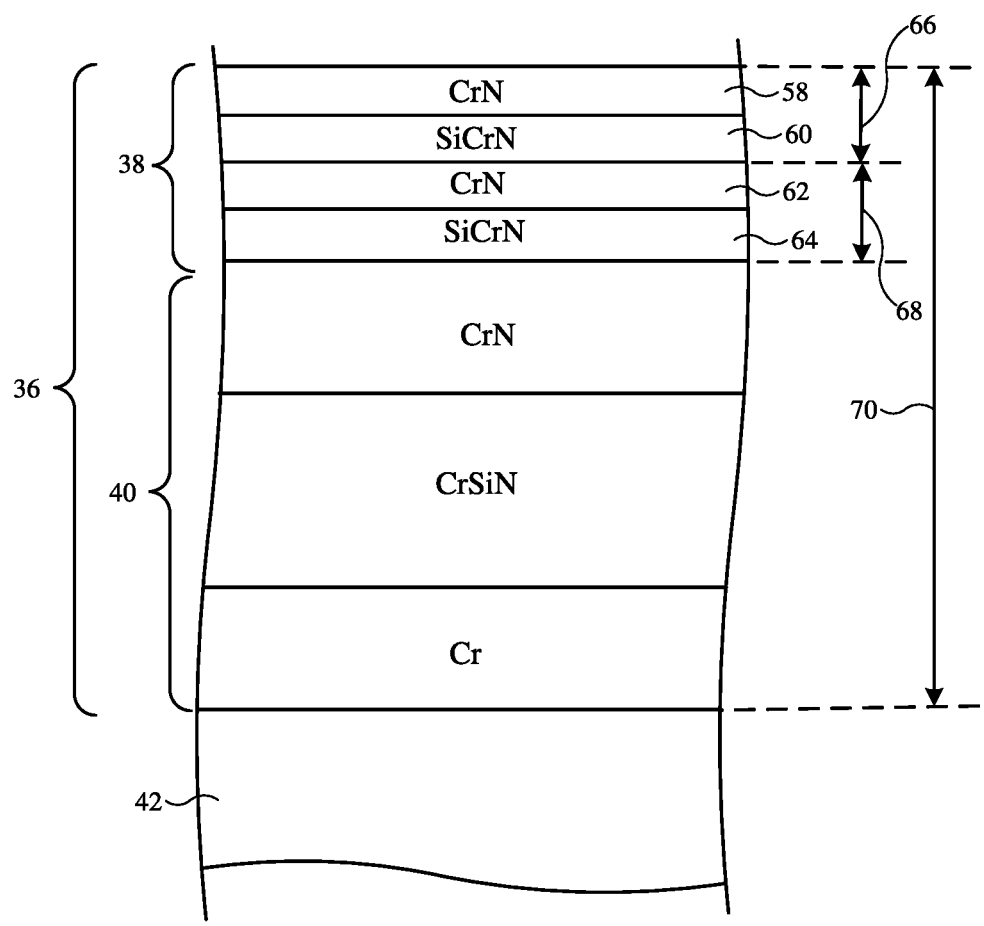
FIG. 6 is a cross-sectional side view of an illustrative visible-light-reflecting coating having a four-layer thin-film interference filter with alternating CrN and SiCrN layers in accordance with some embodiments.

The example of FIG. 5 in which thin-film interference filter 38 has two layers is merely illustrative. In another suitable arrangement, thin-film interference filter 38 may have four layers. FIG. 6 is a cross-sectional side view showing one illustrative composition for coating 36 in an example where thin-film interference filter 38 has four layers.

As shown in FIG. 6, thin-film interference filter 38 may include a lowermost (bottom) layer 64 layered on transition layer 50. Thin-film interference filter 38 may also include a second-lowermost layer 62 layered on lowermost layer 64. In addition, thin-film interference filter 38 may include a second-uppermost layer 60 layered on second-lowermost layer 62. Thin-film interference filter 38 may also include an uppermost layer 58 layered on second-uppermost layer 60. Lowermost layer 64 and second-lowermost layer 62 may collectively exhibit thickness 68. Thickness 68 may be 0.08-0.12 microns, 0.09-0.11 microns, 0.05-0.15 microns, 0.1 microns, 0.08-0.16 microns, greater than 0.05 microns, greater than 0.09 microns, less than 0.2 microns, or other thicknesses (e.g., the same thickness as thickness 54 of FIG. 5 or another thickness). Uppermost layer 58 and second-uppermost layer 60 may collectively exhibit thickness 66. Thickness 66 may be 0.08-0.12 microns, 0.09-0.11 microns, 0.05-0.15 microns, 0.1 microns, 0.08-0.16 microns, greater than 0.05 microns, greater than 0.09 microns, less than 0.2 microns, or other thicknesses (e.g., the same thickness as thickness 54 of FIG. 5, the same thickness as thickness 68, or another thickness). Coating 36 may exhibit an overall thickness 70 that is greater than thickness 56 of FIG. 5. Overall thickness 70 may be 1.3-1.9 microns, 1.5-1.7 microns, 1.2-2.0 microns, 1.35-1.85 microns, or another thickness. These thicknesses are described herein for locations where coating 36 exhibits a maximum thickness across its surface area.

In the example of FIG. 6, lowermost layer 64 includes SiCrN and may therefore sometimes be referred to herein as SiCrN layer 64 or lowermost SiCrN layer 64. Second-lowermost layer 62 may include CrN and may therefore sometimes be referred to herein as CrN layer 62 or lowermost CrN layer 62. Lowermost CrN layer 62 and lowermost SiCrN layer 64 may have the same thickness or may have different thicknesses. Uppermost layer 58 includes CrN and may therefore sometimes be referred to herein as CrN layer 58 or uppermost CrN layer 58. Second-uppermost layer 60 includes SiCrN and may therefore sometimes be referred to herein as SiCrN layer 60 or uppermost SiCrN layer 60. Uppermost SiCrN layer 60 and uppermost CrN layer 58 may have the same thicknesses or may have different thicknesses.

Visible light incident on coating 36 will reflect off of the air-film interface of uppermost CrN layer 58 and each of the layers in thin-film interference filter 38 and constructively and destructively interferes so that the total visible light reflected by coating 36 exhibits the desired color (e.g., a light blue color).

The composition of thin-film interference filter 38 may also contribute to the desired color exhibited by the coating. Uppermost CrN layer 58 may have the same composition as lowermost CrN layer 62 or CrN layers 58 and 62 may have different compositions. CrN layer 58 and/or CrN layer 62 may have the same composition as CrN layer 44 of FIG. 5 or may have a different composition. Similarly, uppermost SiCrN layer 60 may have the same composition as lowermost SiCrN layer 64 or SiCrN layers 60 and 64 may have different compositions. SiCrN layer 60 and/or SiCrN layer 64 may have the same composition as SiCrN layer 46 of FIG. 5 or may have a different composition.

As examples, the composition of SiCrN layer 64 may be selected such that the atomic percentage of chromium (Cr) atoms in SiCrN layer 64 is between 40-60%, 30-70%, 40-50%, 45-55%, 44-54%, 40-52%, 41-61%, 46-54%, 48-55%, greater than 40%, greater than 45%, greater than 35%, less than 50%, less than 55%, less than 60%, less than 65%, or other values, such that the atomic percentage of silicon (Si) atoms is between 10-20%, 8-23%, 12-24%, 7-15%, 12-16%, 9-20%, 10-25%, greater than 10%, greater than 15%, greater than 8%, less than 20%, less than 25%, less than 30%, or other values (e.g., values less than the atomic percentage of Cr atoms in SiCrN layer 64), and such that the atomic percentage of nitrogen (N) atoms is between 30-40%, 31-42%, 26-45%, 22-50%, 27-41%, greater than 25%, greater than 30%, greater than 35%, less than 40%, less than 45%, less than 50%, or other values (e.g., values greater than the atomic percentage of Si atoms and/or less than the atomic percentage of Cr atoms in SiCrN layer 64). The composition of CrN layer 62 may be selected such that the atomic percentage of Cr atoms in CrN layer 62 is between 40-50%, 30-70%, 41-51%, 35-65%, 41-51%, greater than 45%, greater than 40%, greater than 35%, less than 50%, less than 55%, less than 60%, or other values (e.g., values that are less than the atomic percentage of Cr atoms in SiCrN layer 64) and such that the atomic percentage of N atoms is between 35-45%, 30-50%, 37-46%, 25-45%, 31-52%, greater than 40%, greater than 35%, greater than 30%, greater than 25%, less than 45%, less than 50%, less than 65%, or other values (e.g., values that are less than the atomic percentage of Cr atoms in CrN layer 62 and/or values that are greater than the atomic percentage of N atoms in CrSiN layer 64). The composition of SiCrN layer 60 may be selected such that the atomic percentage of chromium (Cr) atoms in SiCrN layer 60 is between 30-40%, 20-50%, 21-41%, 27-36%, 25-38%, greater than 30%, greater than 25%, greater than 20%, greater than 15%, less than 35%, less than 40%, less than 45%, less than 50%, less than 55%, or other values (e.g., values that are less than the atomic percentage of Cr atoms in SiCrN layer 64 and CrN layer 62), such that the atomic percentage of silicon (Si) atoms is between 10-20%, 10-25%, 8-30%, 15-22%, 12-26%, greater than 15%, greater than 10%, greater than 5%, less than 20%, less than 25%, less than 30%, or other values (e.g., values greater than the atomic percentage of Si atoms in SiCrN layer 64), and such that the atomic percentage of nitrogen (N) atoms is between 40-60%, 45-55%, 30-65%, 42-57%, greater than 50%, greater than 45%, greater than 40%, less than 55%, less than 60%, less than 65%, or other values (e.g., values greater than the atomic percentage of N atoms in SiCrN layer 64 and CrN layer 62) Finally, the composition of CrN layer 58 may be selected such that the atomic percentage of Cr atoms in CrN layer 58 is between 40-50%, 40-55%, 35-60%, 45-55%, greater than 45%, greater than 40%, greater than 35%, less than 50%, less than 55%, less than 60%, or other values (e.g., values that are greater than the atomic percentage of Cr atoms in SiCrN layer 60) and such that the atomic percentage of N atoms is between 35-45%, 30-50%, 33-43%, 25-45%, greater than 35%, greater than 30%, greater than 25%, greater than 20%, less than 40%, less than 45%, less than 50%, or other values (e.g., values that are less than the atomic percentage of N atoms in CrN layer 62 and/or SiCrN layer 60). The atomic percentages described herein may be measured from a top-down reference point, for example.

When configured in this way, thin-film interference filter 38 may configure coating 36 to exhibit a desired color. For example, coating 36 may exhibit an a* value between −5 and 0, between −5 and 2, between −2 and 0, between −1 and 0, between −1 and 1, between −3 and 1, less than 0, less than 1, greater than −1, greater than −2, or another a* value in the L*a*b* color space. At the same time, coating 36 may exhibit a b* value between −20 and −14, between −18 and −12, between −14 and −16, between −12 and −17, between −10 and −20, less than −10, less than −12, less than −14, greater than −16, greater than −20, greater than −25, or another b* value in the L*a*b* color space. In addition, coating 36 may exhibit an L* value between 70 and 80, between 70 and 75, between 70 and 72, between 69 and 74, between 65 and 75, between 60 and 80, between 50 and 70, greater than 70, greater than 65, less than 75, less than 80, or another L* value in the L*a*b* color space. In other words, thin-film interference filter 38 may configure coating 36 to exhibit a light blue color. These L*a*b* values are described herein for locations where coating 36 exhibits a maximum thickness across its surface area.

Figure 7:
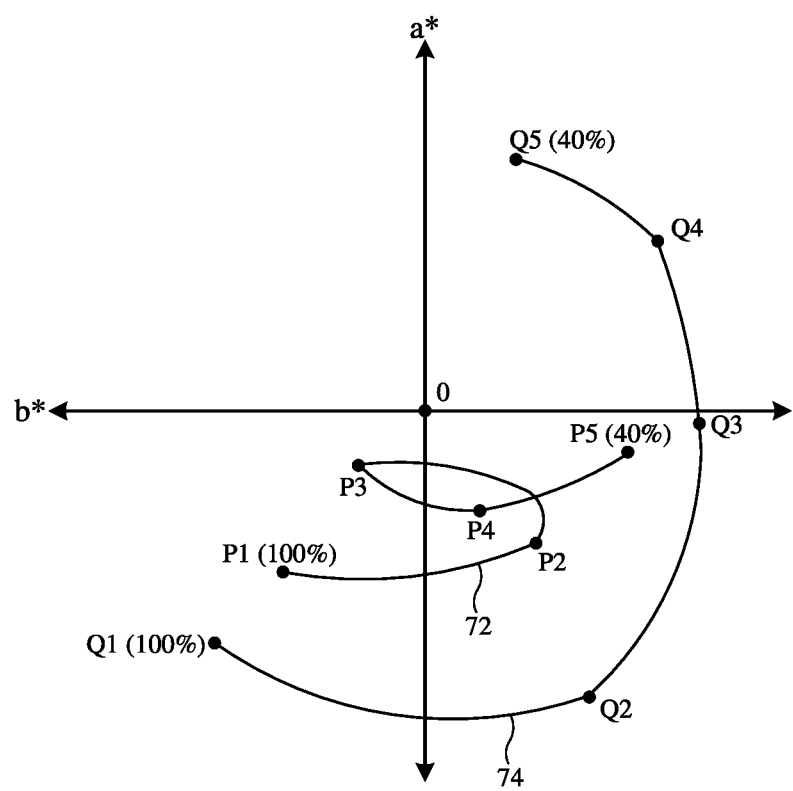
FIG. 7 is a plot of a*b* color space for illustrative visible-light-reflecting coatings of the types shown in FIGS. 4-6 in accordance with some embodiments.

In practice, it can be difficult to provide coating 36 with a uniform thickness across its surface (lateral) area, particularly when depositing on substrates 42 having non-planar three-dimensional shapes. The two-layer thin-film interference filter in FIG. 5 may provide a different color response across coating thickness variations than the color response provided by the four-layer thin-film interference filter in FIG. 6. FIG. 7 is a plot of a*b* color space showing the color response of the coatings in FIGS. 5 and 6 at different thicknesses.

As shown in FIG. 7, curve 72 plots the color response of the coating 36 in FIG. 6 having a four-layer thin-film interference filter, from a location of maximum (100%) thickness at point P1 to a location of minimum thickness (e.g., 40% of the maximum thickness) at point P5. Point P2 on curve 72 corresponds to a coating thickness less than maximum thickness (e.g., 90%). Point P3 on curve 72 corresponds to a coating thickness less than the thickness associated with point P2 (e.g., 70%). Point P4 on curve 72 corresponds to a coating thickness less than the thickness associated with point P3 and greater than the thickness associated with point P5 (e.g., 50%).

Curve 74 of FIG. 7 plots the color response of the coating 36 in FIG. 5 having a two-layer thin-film interference filter, from a location of maximum (100%) thickness at point Q1 to a location of minimum thickness (e.g., 40% of the maximum thickness) at point Q5. Point Q2 on curve 74 corresponds to a coating thickness less than maximum thickness (e.g., 90%). Point Q3 on curve 74 corresponds to a coating thickness less than the thickness associated with point Q2 (e.g., 70%). Point Q4 on curve 74 corresponds to a coating thickness less than the thickness associated with point Q3 and greater than the thickness associated with point Q5 (e.g., 50%).

As a* value increases above a*=0, the color of coating 36 trends yellower. As a* value decreases below a*=0, the color of coating 36 trends bluer. For conductive structures (e.g., underlying substrates 42) that can be coated with coating 36 without a significant reduction in coating thickness across its surface area, the two-layer thin film interference filter 38 of FIG. 5 may be used to provide the conductive structure with a desired color (e.g., a light blue color). Such conductive structures may include, for example, relatively small conductive components 32 (FIG. 2) such as buttons (e.g., a power button, ringer button, volume button, home button, etc.), a SIM card tray, and a colored trim running around opening 20 of FIG. 2 (e.g., an opening for a rear-facing camera in device 10). These conductive structures may be coated using a coating 36 that varies in from maximum thickness to thicknesses between 70% and 90% of the maximum thickness, for example. These thicknesses may correspond to points on curve 74 between points Q2 and Q3. Because points Q2 and Q3 lie below a*=0, the coating may provide these conductive components with a desired light blue color.

However, the two-layer thin film interference filter 38 of FIG. 5 may impart undesired yellower colors when used to coat other components such as conductive sidewall 12W of FIG. 3. For example, coating 36 may exhibit a maximum thickness T2 (e.g., 100%) along the central portion of conductive sidewall 12W but a lesser thickness T1 (e.g., 40% of thickness T2) along the upper or lower end of conductive sidewall 12W (sometimes referred to herein as the spline of housing 12). At the relatively low coating thicknesses along the spline of housing 12, the color of the coating may be characterized by the points on curve 74 between points Q4 and Q5. As shown by points Q4 and Q5, this color is undesirably yellow instead of blue.

The four-layer thin film interference filter 38 of FIG. 6 may therefore be used to coat these components such as conductive sidewall 12W of FIG. 3. At the relatively low coating thicknesses along the spline of housing 12, the color of the coating may be characterized by the points on curve 72 between points P4 and P5. As shown by points P4 and P5, the color of the coating remains the desired light blue color at these thicknesses (e.g., with an a* value between around −3 and 3, a b* value between around −5 and −20, and a relatively high L* such as an L* value of greater than 40, greater than 50, greater than 45, etc.). In this way, the two-layer thin-film interference filter coating of FIG. 5 may be used to coat some conductive structures in device 10 such as buttons, a colored trim running around a rear-facing camera, SIM card trays, etc. whereas the four-layer thin-film interference filter coating of FIG. 6 may be used to coat other conductive structures in device 10 such as conductive sidewall 12W and conductive screws in device 10. This may allow each of the components to exhibit the same desired color (e.g., a light blue color) with a high degree of color similarity between the components.

Figure 8:
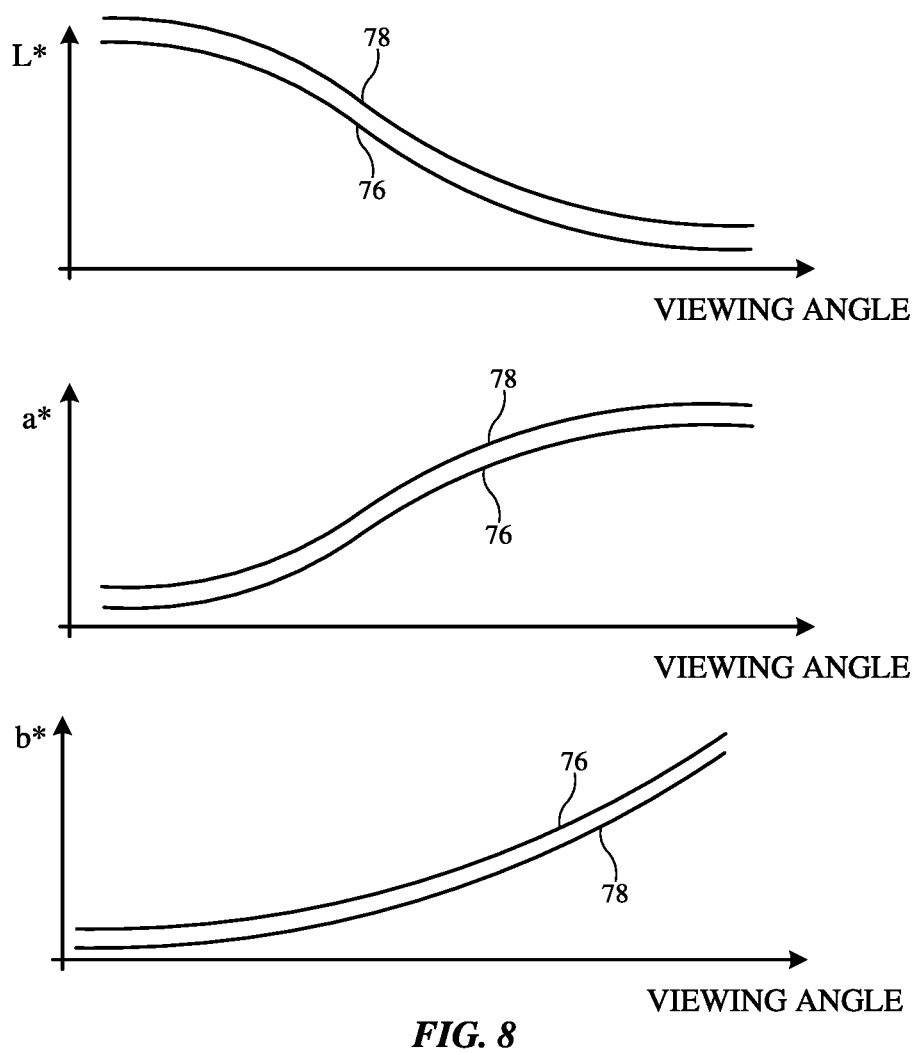
FIG. 8 includes L*, a*, and b* plots as a function of viewing angle for illustrative visible-light-reflecting coatings of the types shown in FIGS. 4-6 in accordance with some embodiments.

Both the coating of FIG. 5 and the coating of FIG. 6 exhibit a relatively uniform color response as a function of viewing angle. Curves 76 of FIG. 8 plot the L*, a*, and b* values of the two-layer thin-film interference filter coating of FIG. 5 as a function of viewing angle (incident angle). Curves 78 of FIG. 8 plot the L*, a*, and b* values of the four-layer thin-film interference filter coating of FIG. 6 as a function of viewing angle (incident angle). As shown by curves 76 and 78, both coatings exhibit roughly the same color (e.g., within 0-3 L*, a*, and b* values) and exhibit the same shifts in color as a function of viewing angle. This may allow all of the coated conductive structures in device 10 to appear approximately the same color as the user views the device from different angles, thereby providing device 10 with an attractive aesthetic appearance for the user over a wide variety of operating conditions. The examples of FIGS. 7 and 8 are merely illustrative. Curves 72, 74, 76, and 78 may have other shapes. If desired, layer 58 and/or layer 62 of FIG. 6 may also include Si atoms (e.g., layers 58 and/or 62 may be SiCrN layers). In these examples, the atomic percentages of the elements in each layer may be varied between two or more of layers 58-64 of FIG. 6 (e.g., there may be less (or more) Si in layers 58 and 62 than in layers 60 or 64, etc.).

The foregoing is merely illustrative and various modifications can be made to the described embodiments. The foregoing embodiments may be implemented individually or in any combination.

What is claimed is:

1. Apparatus comprising:
a conductive substrate; and
a coating on the conductive substrate and having a color, the coating comprising:
adhesion and transition layers, and
a thin-film interference filter on the adhesion and transition layers, wherein the thin-film interference filter comprises an SiCrN layer and a CrN layer, the CrN layer being an uppermost layer of the thin-film interference filter and the SiCrN layer being a lowermost layer of the thin-film interference filter, and wherein, at a location of maximum thickness, the coating has an L* value greater than 60 in an L*a*b* color space, an a* value between −5 and 0 in the L*a*b* color space, and a b* value between −10 and −20 in the L*a*b* color space.

2. The apparatus of claim 1, wherein the CrN layer contacts the SiCrN layer.

3. The apparatus of claim 2, wherein the thin-film interference filter has a thickness between 0.05 and 0.15 microns.

4. The apparatus of claim 2, wherein an atomic percentage of Cr atoms in the SiCrN layer is greater than 45% and less than 60% and wherein an atomic percentage of Si atoms in the SiCrN layer is greater than 15% and less than 25%.

5. The apparatus of claim 4, wherein an atomic percentage of Cr atoms in the CrN layer is greater than 55% and less than 70%.

6. The apparatus of claim 5 wherein, at the location of maximum thickness, the coating has an L* value greater than 65 in the L*a*b* color space.

7. The apparatus of claim 2, wherein the conductive substrate comprises a conductive structure selected from the group consisting of: a conductive button member and a subscriber identity module (SIM) card tray.

8. The apparatus of claim 1, wherein the thin-film interference filter comprises:

an additional CrN layer that contacts the SiCrN layer; and
an additional SiCrN layer that contacts the CrN layer and that contacts the additional CrN layer.

9. The apparatus of claim 8, wherein the conductive substrate comprises a conductive electronic device housing sidewall.

10. Apparatus comprising:
a conductive substrate; and
a coating on the conductive substrate and having a color, the coating comprising:
adhesion and transition layers, and
a four-layer thin-film interference filter on the adhesion and transition layers, wherein the four-layer thin-film interference filter has a first SiCrN layer, a first CrN layer that contacts the first SiCrN layer, a second SiCrN layer that contacts the first CrN layer, and a second CrN layer that contacts the second SiCrN layer, the first SiCrN layer being a lowermost layer of the four-layer thin-film interference filter, and wherein an atomic percentage of Cr atoms in the first SiCrN layer is greater than 45% and less than 60% and wherein an atomic percentage of Si atoms in the first SiCrN layer is greater than 15% and less than 25%.

11. The apparatus of claim 10, wherein the coating has a first thickness at a first location on the conductive substrate and a second thickness that is less than the first thickness at a second location on the conductive substrate.

12. The apparatus of claim 11 wherein, at the first location on the conductive substrate, the coating has an L* value greater than 65 in an L*a*b* color space, an a* value between −5 and 0 in the L*a*b* color space, and a b* value between −10 and −20 in the L*a*b* color space.

13. The apparatus of claim 12, wherein the atomic percentage of Si atoms in the first SiCrN layer is less than 20%, an atomic percentage of N atoms in the first SiCrN layer is less than 40%, an atomic percentage of Cr atoms in the second SiCrN layer is less than the atomic percentage of Cr atoms in the first SiCrN layer, an atomic percentage of N atoms in the second SiCrN layer is greater than the atomic percentage of N atoms in the first SiCrN layer, an atomic percentage of Cr atoms in the first CrN layer is greater than the atomic percentage of Cr atoms in the second SiCrN layer, and an atomic percentage of N atoms in the second CrN layer is less than the atomic percentage of N atoms in the second SiCrN layer.

14. The apparatus of claim 12 wherein at the second location on the conductive substrate, the coating has an additional L* value greater than 45 in the L*a*b* color space, an additional a* value between −3 and 3 in the L*a*b* color space, and an additional b* value between −5 and −20 in the L*a*b* color space.

15. The apparatus of claim 14 wherein the conductive substrate comprises a conductive electronic device housing sidewall.

* * * * *